(12) United States Patent
Skyrm et al.

(10) Patent No.: US 12,335,324 B2
(45) Date of Patent: *Jun. 17, 2025

(54) REAL-TIME DISPLAY OF MULTIPLE IMAGES

(71) Applicant: Snap Inc., Santa Monica, CA (US)

(72) Inventors: Matthew James Skyrm, Palo Alto, CA (US); Joshua Robert Russell Jacobson, San Francisco, CA (US); Eric P. Burke, Northville, MI (US)

(73) Assignee: Snap Inc., Santa Monica, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 18/163,813

(22) Filed: Feb. 2, 2023

(65) Prior Publication Data

US 2023/0179555 A1 Jun. 8, 2023

Related U.S. Application Data

(63) Continuation of application No. 16/949,674, filed on Nov. 10, 2020, now Pat. No. 11,588,770, which is a
(Continued)

(51) Int. Cl.
*H04L 29/06* (2006.01)
*G06F 3/0482* (2013.01)
(Continued)

(52) U.S. Cl.
CPC ........ *H04L 65/4053* (2013.01); *G06F 3/0482* (2013.01); *G06F 3/0486* (2013.01);
(Continued)

(58) Field of Classification Search
CPC ......... H04L 51/10; H04L 67/06; H04L 67/53; G06F 3/0482; G06F 3/0486; G06T 3/40
See application file for complete search history.

(56) References Cited

U.S. PATENT DOCUMENTS

| 666,223 A | 1/1901 | Shedlock |
| 4,581,634 A | 4/1986 | Williams |

(Continued)

FOREIGN PATENT DOCUMENTS

| CA | 2887596 A1 | 7/2015 |
| EP | 1146753 A1 | 10/2001 |

(Continued)

OTHER PUBLICATIONS

U.S. Appl. No. 11/750,211 U.S. Pat. No. 8,554,868, filed May 17, 2007, Simultaneous Sharing Communication Interface.
(Continued)

*Primary Examiner* — Evans Desrosiers
(74) *Attorney, Agent, or Firm* — Schwegman Lundberg & Woessner, P.A.

(57) ABSTRACT

A user can share (show) multimedia information while simultaneously communicating (telling) with one or more other users over a network. Multimedia information is received from at least one source. The multimedia information may be manually and/or automatically annotated and shared with other users. The multimedia information may be displayed in an integrated live view simultaneously with other modes of communication, such as video, voice, or text. A simultaneous sharing communication interface provides an immersive experience that lets a user communicate via text, voice, video, sounds, music, or the like, with one or more other users while also simultaneously sharing media such as photos, videos, movies, images, graphics, illustrations, animations, presentations, narratives, music, sounds, applications, files, and the like. The simultaneous sharing interface enables a user to experience a higher level of intimacy in their communication with others over a network.

20 Claims, 15 Drawing Sheets

Related U.S. Application Data continuation of application No. 16/669,130, filed on Oct. 30, 2019, now Pat. No. 10,862,951, which is a continuation of application No. 15/396,133, filed on Dec. 30, 2016, now Pat. No. 10,491,659, which is a continuation of application No. 14/047,662, filed on Oct. 7, 2013, now Pat. No. 9,608,949, which is a continuation of application No. 11/750,211, filed on May 17, 2007, now Pat. No. 8,554,868.

(60) Provisional application No. 60/883,760, filed on Jan. 5, 2007.

(51) Int. Cl.
*G06F 3/0486* (2013.01)
*G06F 40/169* (2020.01)
*H04L 51/10* (2022.01)
*H04L 65/4053* (2022.01)
*H04L 65/75* (2022.01)
*H04L 67/06* (2022.01)
*G06T 3/40* (2006.01)
*H04L 67/53* (2022.01)

(52) U.S. Cl.
CPC ............ *G06F 40/169* (2020.01); *H04L 51/10* (2013.01); *H04L 65/75* (2022.05); *H04L 67/06* (2013.01); *G06T 3/40* (2013.01); *H04L 67/53* (2022.05)

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,272,484 B1 | 8/2001 | Martin et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,687,877 B1 | 2/2004 | Sastry et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,589,749 B1 * | 9/2009 | De Laurentis ......... G06F 9/451 345/676 |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Loffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,276,092 B1 | 9/2012 | Narayanan et al. |

(56) References Cited

U.S. PATENT DOCUMENTS

| | | |
|---|---|---|
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,554,868 B2 | 10/2013 | Skyrm et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,608,949 B2 | 3/2017 | Skyrm et al. |
| 9,628,950 B1 | 4/2017 | Noeth et al. |
| 9,710,821 B2 | 7/2017 | Heath |
| 9,854,219 B2 | 12/2017 | Sehn |
| 10,135,765 B1 | 11/2018 | Skyrm et al. |
| 10,491,659 B1 | 11/2019 | Skyrm et al. |
| 10,862,951 B1 | 12/2020 | Skyrm et al. |
| 2001/0025309 A1 | 9/2001 | Macleod Beck et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2002/0168621 A1 | 11/2002 | Cook |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0203731 A1* | 10/2003 | King ............... H04M 15/84 455/566 |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0021624 A1 | 1/2005 | Herf et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0132288 A1 | 6/2005 | Kirn et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0227678 A1 | 10/2005 | Agrawal et al. |
| 2005/0235062 A1 | 10/2005 | Lunt et al. |
| 2005/0288954 A1 | 12/2005 | McCarthy et al. |
| 2006/0026067 A1 | 2/2006 | Nicholas et al. |
| 2006/0031560 A1 | 2/2006 | Warshavsky et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0170958 A1 | 8/2006 | Jung et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2006/0294469 A1 | 12/2006 | Sareen et al. |
| 2007/0004426 A1 | 1/2007 | Pfleging et al. |

(56) References Cited

U.S. PATENT DOCUMENTS

| | | |
|---|---|---|
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0124245 A1 | 5/2007 | Sato et al. |
| 2007/0136228 A1 | 6/2007 | Petersen |
| 2007/0157105 A1 | 7/2007 | Owens |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |

(56) References Cited

U.S. PATENT DOCUMENTS

| | | |
|---|---|---|
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0101568 A1 | 4/2014 | Skyrm et al. |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'Keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |

(56) References Cited

U.S. PATENT DOCUMENTS

| | | |
|---|---|---|
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0222814 A1 | 8/2015 | Li et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0277419 A1 | 9/2016 | Allen et al. |
| 2016/0321708 A1 | 11/2016 | Sehn |
| 2017/0006094 A1 | 1/2017 | Abou Mahmoud et al. |
| 2017/0061308 A1 | 3/2017 | Chen et al. |
| 2017/0287006 A1 | 10/2017 | Azmoodeh et al. |
| 2021/0058448 A1 | 2/2021 | Skyrm et al. |

FOREIGN PATENT DOCUMENTS

| | | |
|---|---|---|
| EP | 2051480 A1 | 4/2009 |
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |

OTHER PUBLICATIONS

U.S. Appl. No. 14/047,662 U.S. Pat. No. 9,608,949, filed Oct. 7, 2013, Simultaneous Sharing Communication Interface.

U.S. Appl. No. 15/396,117 U.S. Pat. No. 10,135,765, filed Dec. 30, 2016, Real-Time Display of Multiple Annotated Images.

U.S. Appl. No. 15/396,133 U.S. Pat. No. 10,491,659, filed Dec. 30, 2016, Real-Time Display of Multiple Images (as amended).

U.S. Appl. No. 16/669,130 U.S. Pat. No. 10,862,951, filed Oct. 30, 2019, Real-Time Display of Multiple Images.

U.S. Appl. No. 16/949,674 U.S. Pat. No. 11,588,770, filed Nov. 10, 2020, Real-Time Display of Multiple Images.

"A Whole New Story", Snap, Inc., [Online] Retrieved from the Internet: <URL: https://www.snap.com/en-US/news/>, (2017), 13 pgs.

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 11/750,211, 312 Amendment filed Jun. 25, 2013", 10 pgs.

"U.S. Appl. No. 11/750,211, Advisory Action mailed Jan. 11, 2010", 4 pgs.

"U.S. Appl. No. 11/750,211, Advisory Action mailed May 31, 2012", 3 pgs.

"U.S. Appl. No. 11/750,211, Final Office Action mailed Mar. 13, 2012", 14 pgs.

"U.S. Appl. No. 11/750,211, Final Office Action mailed Oct. 23, 2009", 13 pgs.

"U.S. Appl. No. 11/750,211, Final Office Action mailed Oct. 28, 2010", 16 pgs.

"U.S. Appl. No. 11/750,211, Non Final Office Action mailed May 7, 2009", 10 pgs.

"U.S. Appl. No. 11/750,211, Non Final Office Action mailed May 12, 2010", 15 pgs.

"U.S. Appl. No. 11/750,211, Non Final Office Action mailed Oct. 6, 2011", 16 pgs.

"U.S. Appl. No. 11/750,211, Notice of Allowance mailed Jun. 7, 2013", 18 pgs.

"U.S. Appl. No. 11/750,211, Response filed Jan. 4, 2012 to Non Final Office Action mailed Oct. 6, 2011", 12 pgs.

"U.S. Appl. No. 11/750,211, Response filed Mar. 28, 2011 to Final Office Action mailed Oct. 28, 2010", 10 pgs.

"U.S. Appl. No. 11/750,211, Response filed May 14, 2012 to Final Office Action mailed Mar. 13, 2012", 12 pgs.

"U.S. Appl. No. 11/750,211, Response filed Aug. 7, 2009 to Non Final Office Action mailed May 7, 2009", 11 pgs.

"U.S. Appl. No. 11/750,211, Response filed Aug. 12, 2010 to Non Final Office Action mailed May 12, 2010", 10 pgs.

"U.S. Appl. No. 11/750,211, Response filed Dec. 23, 2009 to Final Office Action mailed Oct. 23, 2009", 11 pgs.

"U.S. Appl. No. 14/047,662, Final Office Action mailed Sep. 24, 2015", 10 pgs.

"U.S. Appl. No. 14/047,662, Non Final Office Action mailed Jun. 11, 2015", 11 pgs.

"U.S. Appl. No. 14/047,662, Notice of Allowance mailed Nov. 17, 2016", 10 pgs.

"U.S. Appl. No. 14/047,662, Preliminary Amendment filed Oct. 9, 2013", 11 pgs.

"U.S. Appl. No. 14/047,662, Response filed May 13, 2016 to Final Office Action mailed Sep. 24, 2015", 2 pgs.

"U.S. Appl. No. 14/047,662, Response filed Sep. 11, 2015 to Non Final Office Action mailed Jun. 11, 2015", 12 pgs.

"U.S. Appl. No. 15/396,117, Final Office Action mailed Jul. 14, 2017", 27 pgs.

"U.S. Appl. No. 15/396,117, Non Final Office Action mailed Feb. 28, 2017", 21 pgs.

"U.S. Appl. No. 15/396,117, Non Final Office Action mailed Nov. 17, 2017", 29 pgs.

"U.S. Appl. No. 15/396,117, Notice of Allowance mailed Jun. 28, 2018", 10 pgs.

"U.S. Appl. No. 15/396,117, Response filed Feb. 19, 2018 to Non Final Office Action mailed Nov. 17, 2017", 20 pgs.

"U.S. Appl. No. 15/396,117, Response filed Apr. 24, 2017 to Non Final Office Action mailed Feb. 28, 2017", 22 pgs.

"U.S. Appl. No. 15/396,133 , Non Final Office Action mailed Mar. 21, 2017", 17 pgs.

"U.S. Appl. No. 15/396,133, Examiner Interview Summary mailed Jun. 27, 2017", 5 pgs.

(56) References Cited

OTHER PUBLICATIONS

"U.S. Appl. No. 15/396,133, Examiner Interview Summary mailed Aug. 15, 2018", 3 pgs.
"U.S. Appl. No. 15/396,133, Final Office Action mailed May 15, 2018", 19 pgs.
"U.S. Appl. No. 15/396,133, Final Office Action mailed Jul. 31, 2017", 21 pgs.
"U.S. Appl. No. 15/396,133, Non Final Office Action mailed Nov. 2, 2018", 12 pgs.
"U.S. Appl. No. 15/396,133, Non Final Office Action mailed Dec. 22, 2017", 19 pgs.
"U.S. Appl. No. 15/396,133, Notice of Allowance mailed Jul. 23, 2019", 12 pgs.
"U.S. Appl. No. 15/396,133, Response filed Jun. 21, 2017 to Non Final Office Action mailed Mar. 21, 2017", 12 pgs.
"U.S. Appl. No. 15/396,133, Response Filed Aug. 15, 2018 to Final Office Action mailed May 15, 2018", 16 pgs.
"U.S. Appl. No. 15/396,133, Response filed Oct. 31, 2017 to Final Office Action mailed Jul. 31, 2017", 13 pgs.
"U.S. Appl. No. 15/396,133, Response filed May 1, 2019 to Non Final Office Action mailed Nov. 2, 2018", 14 pgs.
"U.S. Appl. No. 15/396,133, Response filed Mar. 22, 2018 to Non Final Office Action mailed Dec. 22, 2017", 14 pgs.
"U.S. Appl. No. 16/669,130, Notice of Allowance mailed Aug. 5, 2020", 9 pgs.
"U.S. Appl. No. 16/949,674, Non Final Office Action mailed Jul. 22, 2022", 10 pgs.
"U.S. Appl. No. 16/949,674, Notice of Allowance mailed Oct. 26, 2022", 9 pgs.
"U.S. Appl. No. 16/949,674, Response filed Sep. 27, 2022 to Non Final Office Action mailed Jul. 22, 2022", 8 pgs.
"BlogStomp", StompSoftware, [Online] Retrieved from the Internet: <URL: http://stompsoftware.com/blogstomp>, (accessed May 24, 2017), 12 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"Flickr Hacks", Bausch. O'Reilly Media Inc., Chapters 1, 6 and 12, (2006), 32 pgs.
"Geotagging with Zonetag and Bluetooth GPS", [Online] Retrieved from the Internet : <http://plasticbag.org/archives/2006/geotagging_with_zonet>, (2006), 7 pgs.
"InstaPlace Photo App Tell The Whole Story", [Online] Retrieved from the Internet: <URL: youtu.be/uF_gFkg1hBM>, (Nov. 8, 2013), 113 pgs., 1:02 min.
"International Application Serial No. PCT/US2015/037251, International Search Report mailed Sep. 29, 2015", 2 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Starbucks Cup Magic", [Online] Retrieved from the Internet: <URL: https://www.youtube.com/watch?v=RWwQXi9RGOw>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Mieszkowski, Katherine, "The Friendster of photo sites", [Online] retrieved from the internet: <http://www.salon.com/2004/12/20/flickr/>, (2004), 12 pgs.
Notopoulos, Katie, "A Guide to the New Snapchat Filters and Big Fonts", [Online] Retrieved from the Internet: <URL: https://www.buzzfeed.com/katienotopoulos/a-guide-to-the-new-snapchat-filters-and-big-fonts?utm_term =.bkQ9qVZWe#.nv58YXpkV>, (Dec. 22, 2013), 13 pgs.
Panzarino, Matthew, "Snapchat Adds Filters, A Replay Function and For Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Roccetti, Marco, "Networking Issues in Multimedia Entertainment", (2004), 1-3 pgs.
Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.

* cited by examiner

REAL-TIME DISPLAY OF MULTIPLE IMAGES

CLAIM OF PRIORITY

This application is a Continuation of and claims the benefit of U.S. patent application Ser. No. 16/949,674, filed Nov. 10, 2020, which is a Continuation of and claims the benefit of U.S. patent application Ser. No. 16/669,130, filed Oct. 30, 2019, which is a Continuation of and claims the benefit of U.S. patent application Ser. No. 15/396,133, filed Dec. 30, 2016, which is a Continuation of and claims the benefit of U.S. patent application Ser. No. 14/047,662, filed Oct. 7, 2013, which is a Continuation of and claims the benefit of U.S. patent application Ser. No. 11/750,211, filed May 17, 2007, which claims priority from U.S. Provisional Patent Application No. 60/883,760, filed Jan. 5, 2007, all of which are herein incorporated by reference in their entireties.

TECHNICAL FIELD

The present invention relates generally to communications and, more particularly, but not exclusively to enabling a user to simultaneously share multimedia information, while communicating with one or more other users.

BACKGROUND

Sharing of multimedia information has become prevalent on computing devices and has changed our everyday lives. Mobile devices, such as digital cameras, video recorders, PDAs, and cell-phones, increasingly, have become enabled with wireless data connectivity. Users are able to send and receive multimedia information from these mobile devices more readily. However, users cannot easily identify relevant sources of, and recipients for their multimedia information.

Tremendous changes have also been occurring in the Internet that influence our everyday lives. For example, online social networks have become the new meeting grounds. They have been called the new power lunch tables and new golf courses for business life in the U.S. Moreover, many people are using such online social networks to reconnect themselves to their friends, their neighborhood, their community, and the world.

The development of such online social networks touch countless aspects of our everyday lives, providing instant access to people of similar mindsets, and enabling us to form partnerships with more people in more ways than ever before.

One aspect of our everyday lives that may benefit from multimedia information sharing is improved communication between people in remote locations. In particular, users would like to feel a sense of intimacy or immediacy in their multimedia online communication. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
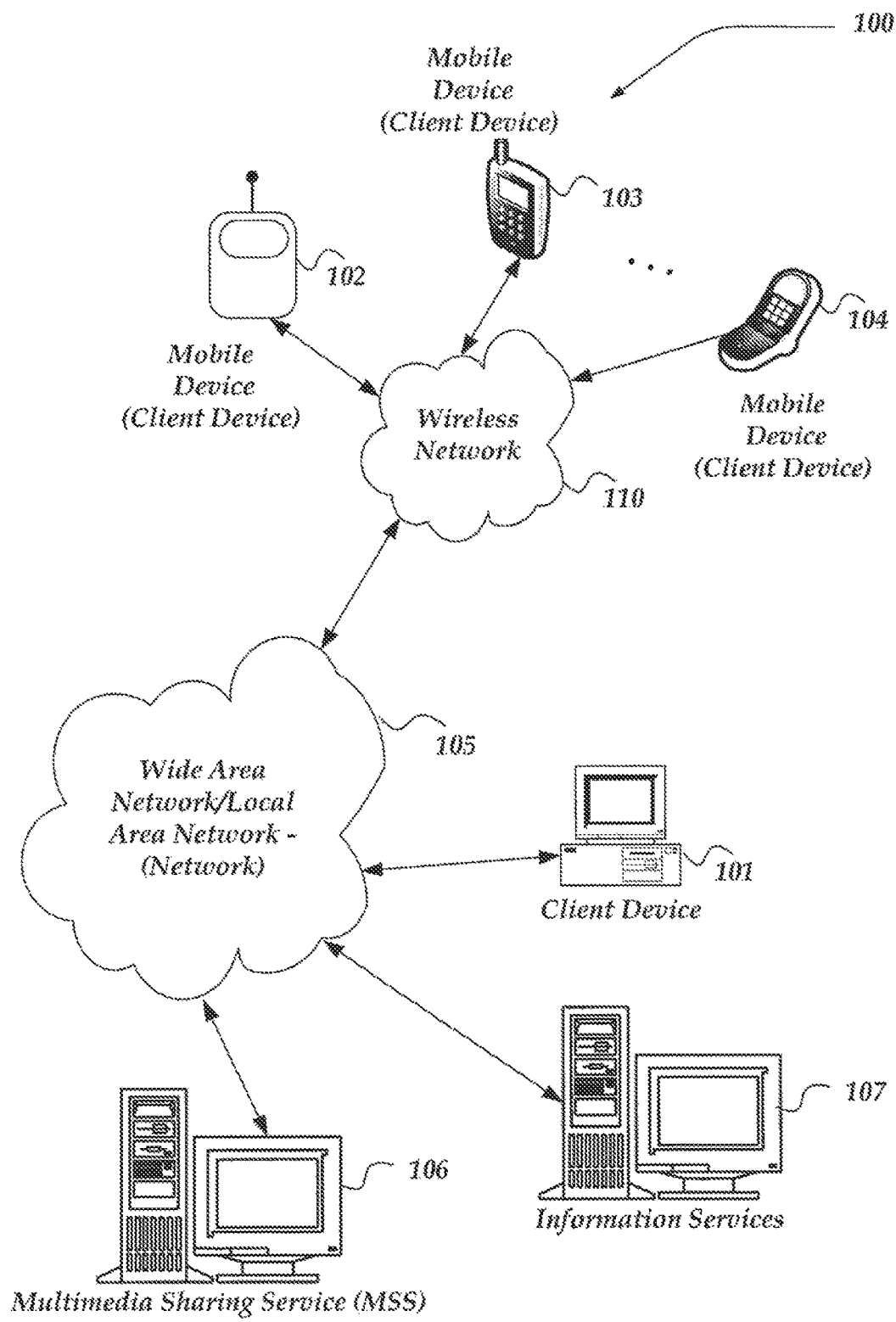
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "social network" and "social community" refer to a concept that an individual's personal network of friends, family colleagues, coworkers, and the subsequent connections within those networks, can be utilized to find more relevant connections for a variety of activities, including, but not limited to dating, job networking, service referrals, content sharing, like-minded individuals, activity partners, or the like.

An online social network typically comprises a person's set of direct and/or indirect personal relationships, including real and virtual privileges and permissions that users may associate with these people. Direct personal relationships usually include relationships with people the user can communicated with directly, including family members, friends, colleagues, coworkers, and other people with which the person has had some form of direct contact, such as contact in person, by telephone, by email, by instant message, by letter, or the like. These direct personal relationships are sometimes referred to as first-degree relationships. First-degree relationships can have varying degrees of closeness, trust, and other characteristics.

Indirect personal relationships typically include relationships through first-degree relationships to people with whom a person has not had some form of direct or limited direct contact, such as in being cc'd on an e-mail message, or the like. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree relationship. Similarly, a friend of a friend of a friend can be characterized as three degrees of separation or a third-degree relationship.

As used herein, "live" or a "live view" refers to providing of real-time or approximately real-time data. It is recognized that due to a variety of reasons, transfer of data over a network may be delayed by some varying amount of time. The delay may vary based on conditions of the network, configurations of the network, configuration of the sending and/or receiving device, or the like. Thus, live or a live view may range between real-time data transfers to some varying amount of time delay.

Moreover, the term "social networking information," refers to both dynamic as well as less dynamic characteristics of a social network. Social networking information includes various profile information about a member, including, but not limited to the member's avatar, contact information, the member's preferences, degrees of separation between the member and another member, a membership in an activity, group, or the like, or the like.

Social networking information further may include various information about communications between the member and other members in the social network, including, but not limited to emails, SMS messages, IM messages, Multimedia Message (MMS) messages, alerts, audio messages, phone calls, either received or sent by the member, or the like.

Various "meta-data" may also be associated with the social networking information. Thus, for example, various permissions for access may be associated with at least some of the social networking information. Some access permissions (or sharing rules) may be selected, for example, based, in part, on an input by the member, while other access permissions may be defaulted based on other events, constraints, or the like.

The term "multimedia information" as used herein refers to information comprising visual and/or audio information. Multimedia information may include images, video, movies, presentations, animations, illustrations, narratives, music, sound effects, voice, or the like. As used herein, the term "annotation" refers to marking and/or modifying information with another information.

As used herein, the term "retrieving" refers to the process of sending a request for information, and receiving the information. The request may include a search query, an identifier for the information, or the like. As used herein, the term "searching" refers to providing a query based on at least one criteria. The criteria may include a search term, a name, a Uniform Resource Locator (URL), a date/time-stamp, a part or combination thereof, or the like. As used herein, the term "sharing" refers to sending information between one user and at least one other user.

Briefly stated the present invention is directed towards enabling a user to share multimedia information while simultaneously communicating (telling) with one or more other users. Multimedia information is received from at least one source. The multimedia information may be manually and/or automatically annotated and shared with other users. The multimedia information may be displayed in an integrated live view simultaneously with other modes of communication, such as video, voice, music, sounds, or text. In one embodiment, a simultaneous sharing communication interface provides an immersive experience that lets a user communicate via text, voice, video, sounds, music, or the like, with one or more other users while also simultaneously sharing media such as photos, videos, movies, images, graphics, illustrations, animations, presentations, narratives, music, sounds, applications, files, and the like. The simultaneous sharing interface enables a user to experience a higher level of intimacy in their communication with others over a network.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, Multimedia Sharing Service (MSS) 106, mobile devices (client devices) 102-104, client device 101, and information services 107.

One embodiment of mobile devices 102-103 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one other client application that is configured to receive content from another computing device. The client application may include a capability to provide and receive textual content, multimedia information, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to MSS 106, client device 101, or other computing devices.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as MSS 106, client device 101, or the like. However, the present invention is not limited to these message protocols, and virtually any other message protocol may be employed.

Mobile devices 102-104 may be further configured to enable a user to participate in communications sessions, such as IM sessions. As such, mobile devices 102-104 may include a client application that is configured to manage various actions on behalf of the client device. For example, the client application may enable a user to interact with the browser application, email application, IM applications, SMS application, and the like.

Mobile devices 102-104 may further be configured to include a client application that enables the end-user to log into an end-user account that may be managed by another computing device, such as MSS 106. Such end-user account, for example, may be configured to enable the end-user to receive emails, send/receive IM messages, SMS messages, access selected web pages, participate in a social networking activity, or the like. However, participation in various social networking activities may also be performed without logging into the end-user account.

In addition, mobile devices 102-104 may include another application that is configured to enable the mobile user to share and/or receive multimedia information, and to display integrated live views for providing the multimedia information. In one embodiment, each of mobile devices 102-104 may share with and/or receive the multimedia information from MSS 106 and/or from another one of mobile devices 102-104. In conjunction with sharing multimedia information, mobile devices 102-104 may enable an interaction with each other, through sharing various messages, and generally participating in a variety of integrated social experiences beyond merely voice communications or text messages (e.g., IM). In one embodiment, mobile devices 102-104 may enable the interaction with a user associated with received multimedia information. For example, a user of one of mobile devices 102-104 may send a comment on the multimedia information to another user of another one of mobile devices 102-104.

Mobile devices 102-104 may also communicate with non-mobile client devices, such as client device 101, or the like. In one embodiment, such communications may include participation in social networking activities, including sharing of multimedia information.

Client device 101 may include virtually any computing device capable of communicating over a network to send and receive information, including social networking information, or the like. The set of such devices may include devices that typically connect using a wired or wireless communications medium such as personal computers, multiprocessor systems, microprocessor-based or programmable consumer electronics, network PCs, or the like.

In one embodiment, client devices 101-104 may be configured to enable a communication between users over network 105. Client devices 101-104 may be configured to receive or otherwise retrieve multimedia information from, for example, a file system, a data store, MSS 106, information services 107 (e.g., via a HTTP/HTTPS/FTP and using a URL) or the like. Devices 101-104 may be further configured to annotate the multimedia information, and/or share the multimedia information simultaneous with sending a communication between the users, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including $2^{nd}$ (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102-104 and another computing device, network, and the like.

Network 105 is configured to couple MSS 106 and its components with other computing devices, including, mobile devices 102-104, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (IS- DNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between MSS 106, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of MSS 106 is described in more detail below in conjunction with FIG. 3. Briefly, however, MSS 106 may include any computing device capable of connecting to network 105 to enable sharing of multimedia information based on user information and other social networking information. MSS 106 may receive from various participants in a social network, multimedia information, and social networking information, including information associated with activities, moods, events, messages, user information, communications, or the like. MSS 106 may also receive social networking information from a variety of other sources including, for example, information services 107. MSS 106 may store at least some of the received multimedia and/or social networking information for use by one or more social networking members. MSS 106 may also enable sharing and/or sending the multimedia information to another network device, including one of client devices 101-104 based on user information and/or other social networking information.

Devices that may operate as MSS 106 include personal computers desktop computers, multiprocessor systems, microprocessor-based or programmable consumer electronics, network PCs, servers, and the like.

Although FIG. 1 illustrates MSS 106 as a single computing device, the invention is not so limited. For example, one or more functions of MSS 106 may be distributed across one or more distinct computing devices. For example, managing various social networking activities, including sharing of multimedia information, managing Instant Messaging (IM) session, SMS messages, email messages, sharing of contact information, aggregating and/or storing of social networking information, or the like, may be performed by a plurality of computing devices, without departing from the scope or spirit of the present invention.

Information services 107 represents a variety of service devices that may provide additional information for use in generating live views on mobile devices 102-104. Such services include, but are not limited to web services, third-party services, audio services, video services, multimedia services, email services, IM services, SMS services, Video Conferencing Services, VOIP services, calendaring services, multimedia information sharing services, or the like. Devices that may operate as information services 107 include personal computers desktop computers, multiprocessor systems, microprocessor-based or programmable consumer electronics, network PCs, servers, mobile devices, and the like.

Illustrative Mobile Client Environment

Figure 2:
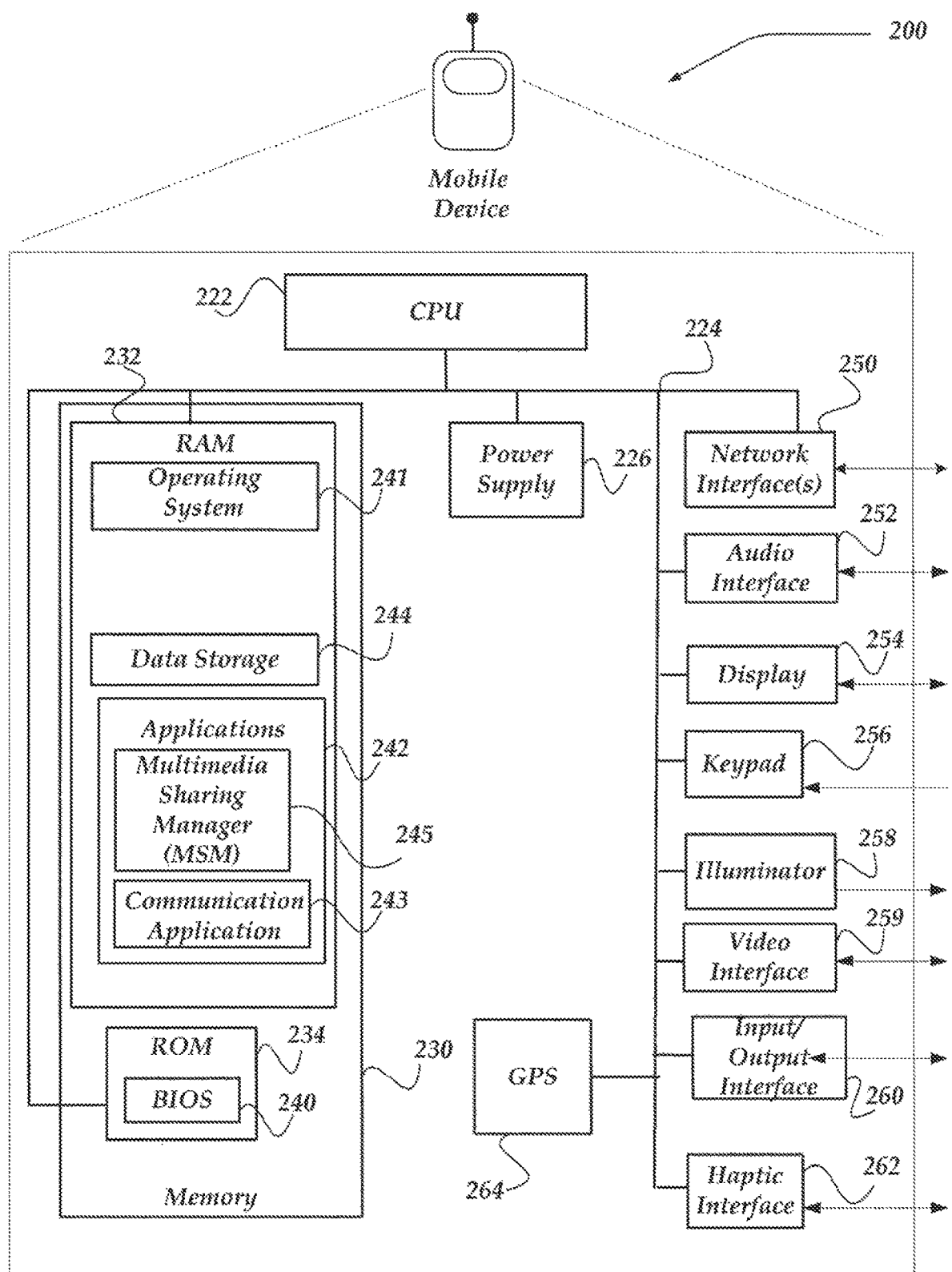
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like.

Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, tri-angulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian™ operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like. Moreover, data storage 244 may also be employed to store multimedia information and/or social networking information including user information, or the like. At least a portion of the multimedia information and/or social networking information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, Video Conferencing applications, VOIP applications, contact managers, task managers, transcoders, database programs, word processing programs, security applications, spreadsheet programs, games, search programs, and so forth. Applications 242 may further include multimedia sharing manager (MSM) 245, and communication application 243.

Communication application 243 includes any component for managing communication over network interface 250. Communication application 243 may be configured to transmit, receive, and/or otherwise process messages (e.g., Video Conferencing messages, VOIP, SMS, MIMS, IM, email, and/or other messages), store such messages, translate between one type of message and another, or the like. Communication application 243 may provide a user interface, such as a conversation screen, video display, or the like.

MSM 245 includes any component configured to manage sharing of multimedia information over network interface 260. MSM 245 may display a window (e.g., a simultaneous sharing window/live view) on display 254, for example. MSM 245 may receive or otherwise retrieve the multimedia information and/or thumbnails for the multimedia information from a variety of applications in applications 242, from a third-party server over network interface 260, from a file/URL on a remote website, on a local file system, on data storage 244, or the like. MSM 245 may display the received/retrieved information in the window. MSM 245 may enable a communication between users over network interface 260. For example, the user of mobile device 200 may use a conversation window within the window to send a message over network interface 260. Simultaneous with sending the message, multimedia information stored, for example, in data storage 244, may be sent over network interface 260 to another user participating in the communication. Operations of MSM 245 may be performed by operations 4-14 of FIGS. 4-14 and/or process 1500 of FIG. 15.

Illustrative Server Environment

Figure 3:
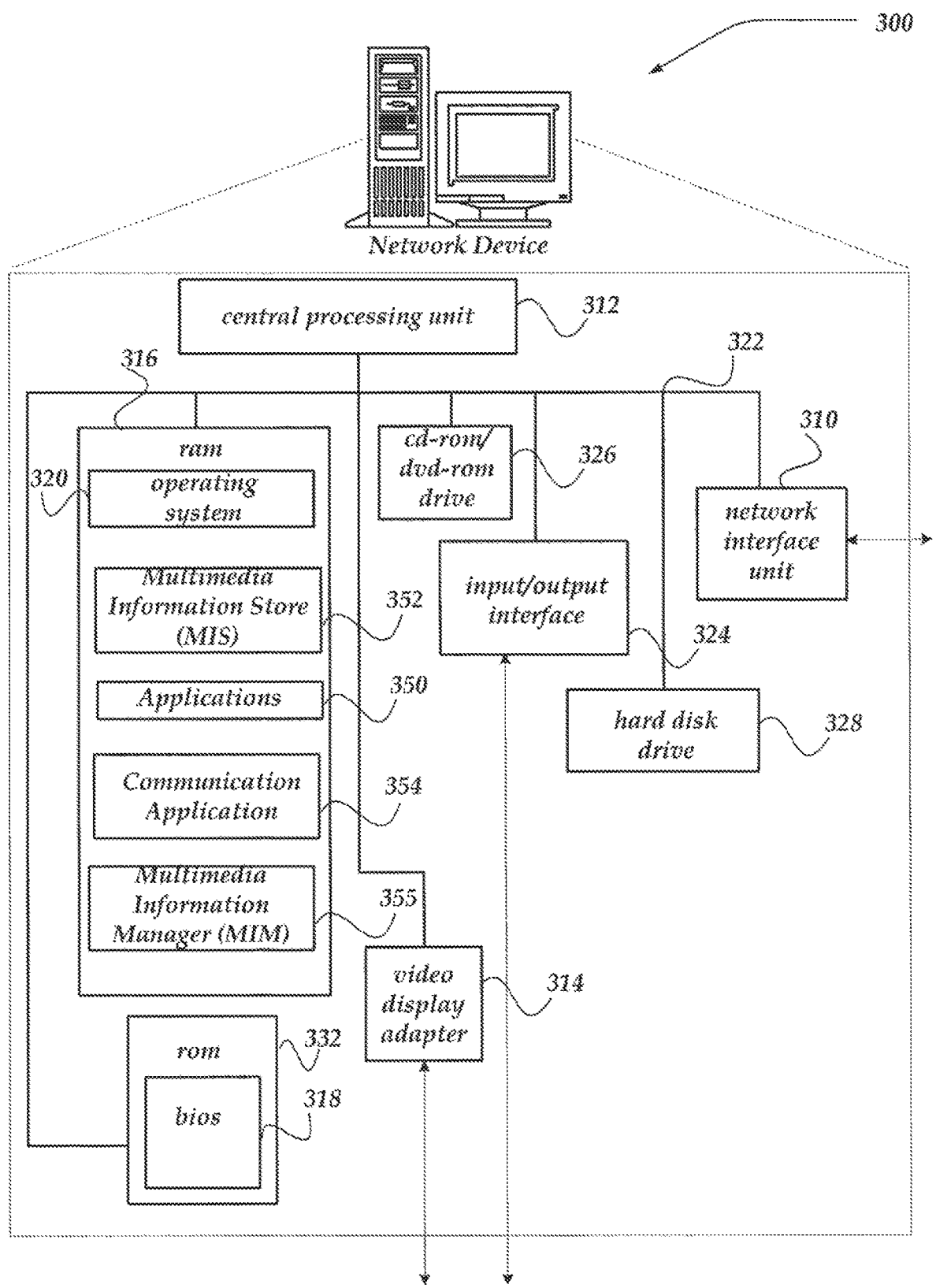
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, MSS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (MC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, Video Conferencing servers, IM message servers, email servers, account management and so forth. Communication application 354 and/or Multimedia Information manager (MIM) 355 may also be included as application programs within applications 350.

Communication application 354 includes any component for managing communication over network interface 310, between a plurality of clients. Communication application 354 may be configured to forward, transmit, receive, and/or otherwise process messages (e.g., Video Conferencing messages, VOIP, SMS, MMS, IM, email, and/or other messages), store such messages, translate between one type of message and another, or the like. Communication application 354 may provide a communication interface, such as a web interface (HTTP/HTML), and XML interface, or the like. Such communication interface may be integrated into, for example, a simultaneous sharing window as described in conjunction with FIGS. 4-14.

MIM 355 includes any component configured to manage multimedia information over network interface 310. MIM 355 may receive a request for a communication between users, using for example, communication applications 354. In one embodiment, communication applications 354 may initiate a communication session between the users, including a Short Message Service (SMS), Multimedia Message Service (MMS), instant messaging (IM), internet relay chat (IRC), Voice Over Internet Protocol (VOIP) session, or the like.

In one embodiment, MIM 355 may receive shared multimedia information or a shared identifier associated with the shared multimedia information over network interface 310. MIM 355 may use Multimedia Information Store (MIS) 352 to manage the shared multimedia information/identifier. In one embodiment, MIS 352 may provide the multimedia information associated with the shared identifier. In one embodiment, MIS 352 may store the shared multimedia information for later processing. MIM 355 may also forward a shared multimedia information between users over network interface 310. In one embodiment, the forwarding of the multimedia information may be simultaneous with forwarding a message within the communication session.

In one embodiment, MIS 352 may store a plurality of received multimedia information. In one embodiment, MIS 352 may be a database, a file structure, or the like. MIS 352 may store the multimedia information into a category structure, such as folders, albums, graphs, trees, or the like. In one embodiment, MIS 352 may search for multimedia information based on a query (e.g., received from MIM 355, over network interface 310, or the like). In one embodiment, based on the query, MIS 352 may provide the searched multimedia information (e.g., over network interface 310).

Illustrative Use Operations

The operation of certain aspects of the invention will now be described with respect to FIGS. 4-14. FIG. 4-14 provide examples of certain operations to further illustrate the invention. While the discussion below in conjunction with FIG. 4-14 relate to photo sharing, any type of multimedia sharing may be similarly enabled without departing from the scope of the invention.

Figure 4:
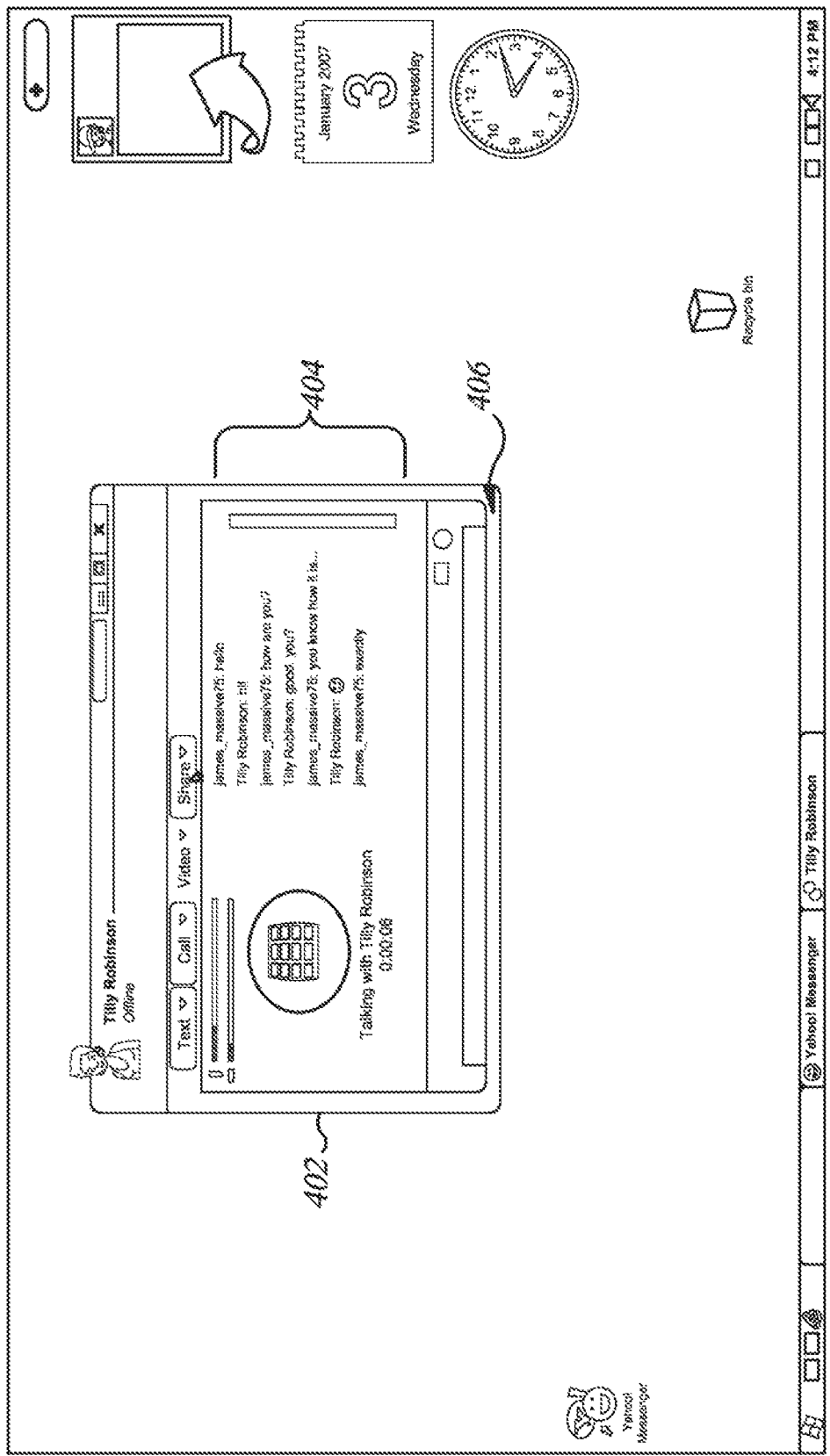
FIGS. 4-14 illustrate screenshots of the novel features for managing a multimedia communication.

FIG. 4 illustrates a voice call with the simultaneous sharing communication interface 402 on the desktop provided by an operating system of a computing device. The desktop is shown with a conversation window 406 that shows two users simultaneously communicating via text messages and voice. Chat history 404 includes recent text messages communicated between users. Although not shown, the conversation window may also include a live video chat window.

Figure 5:
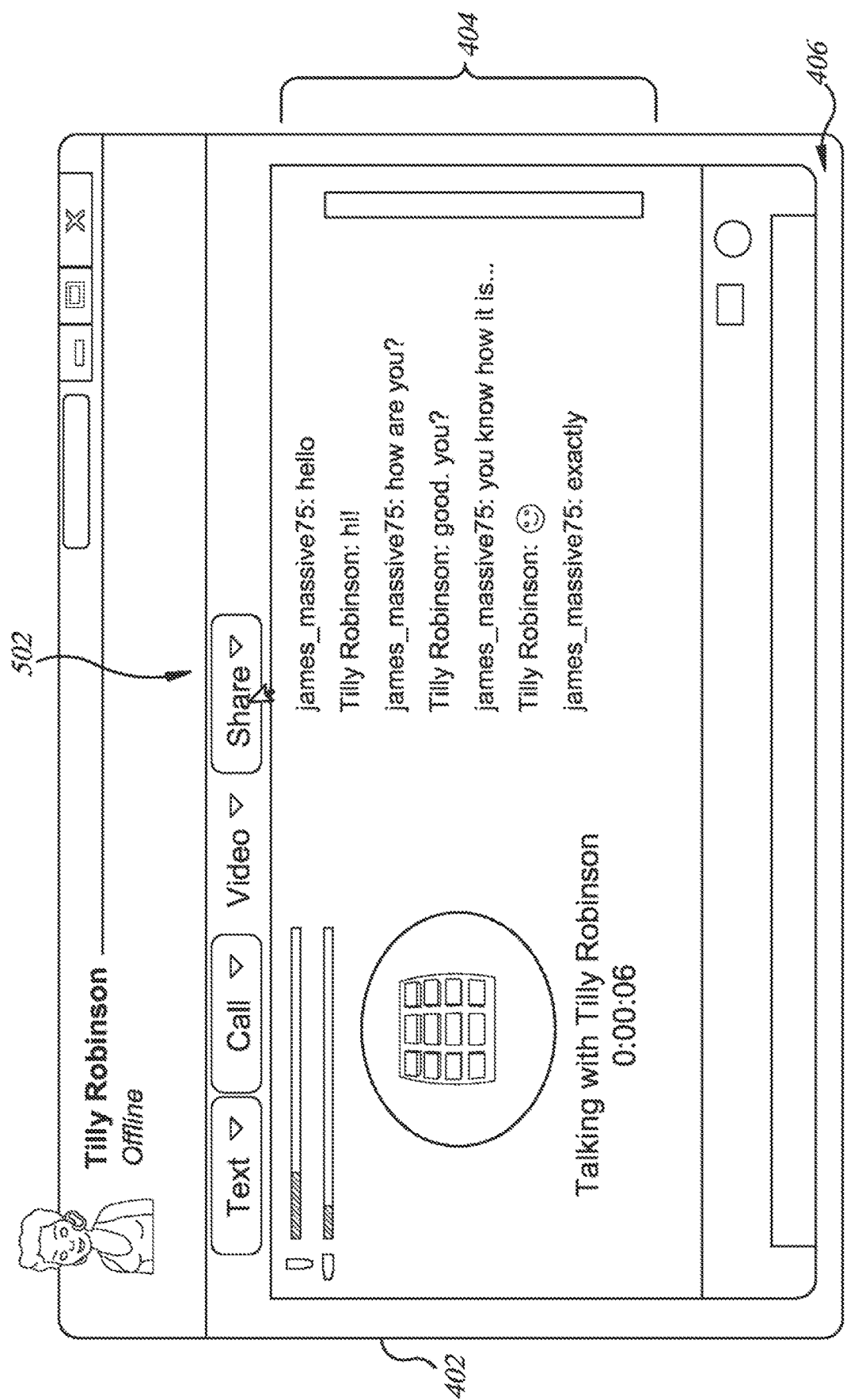

FIG. 5 illustrates a user clicking on a "share" tab 502 in the simultaneous sharing communication interface 402 on the desktop provided by an operating system of a computing device. The desktop is shown with a conversation window 406 that shows two users simultaneously communicating via text messages and voice.

Figure 6:
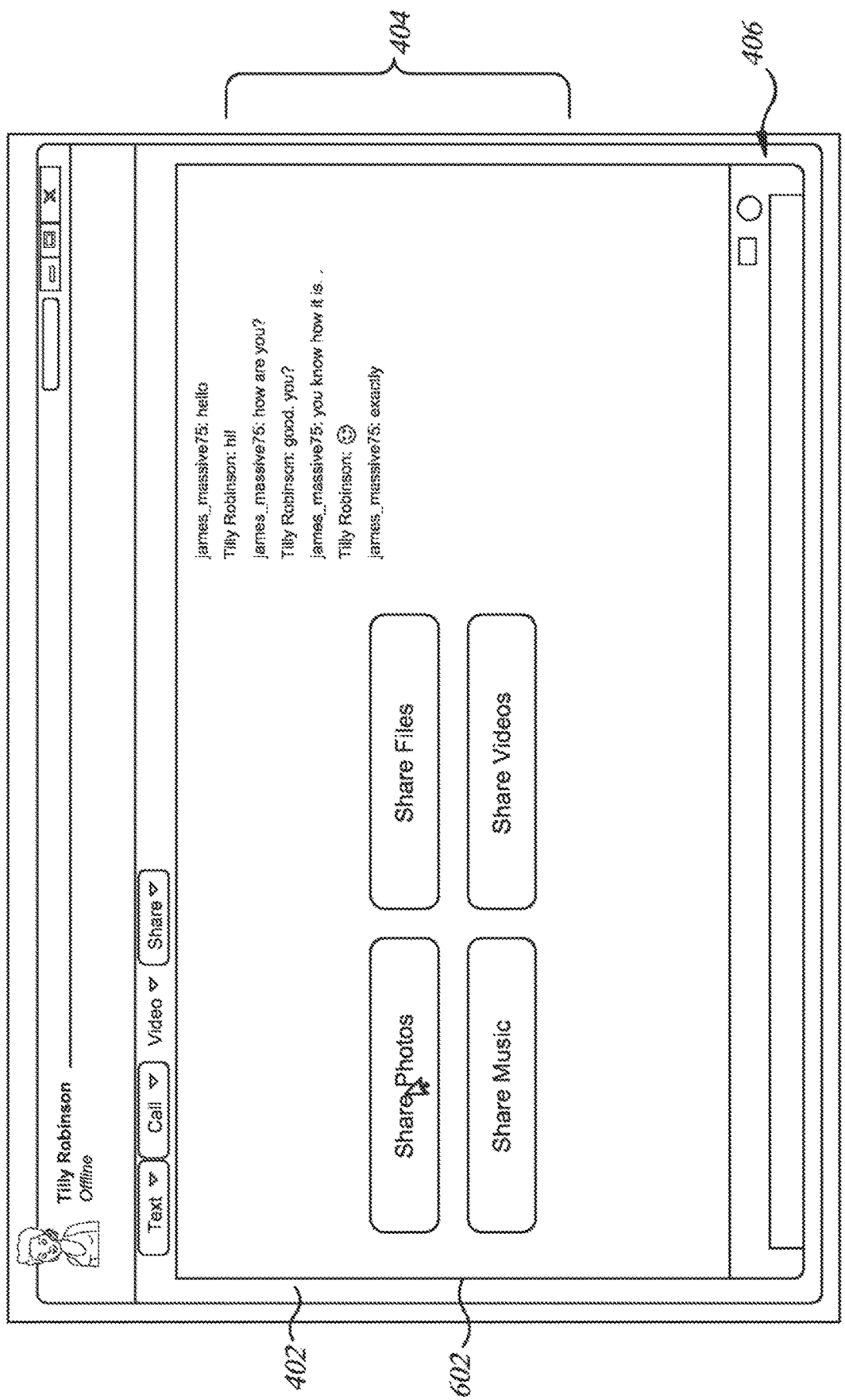

FIG. 6 illustrates a dialog box asking the user what to share. The user has selected "Share Photos" button 602 from the choice menu. Although only four options to choose are shown, in other embodiments, substantially more or less options may be presented in one or more views.

Figure 7:
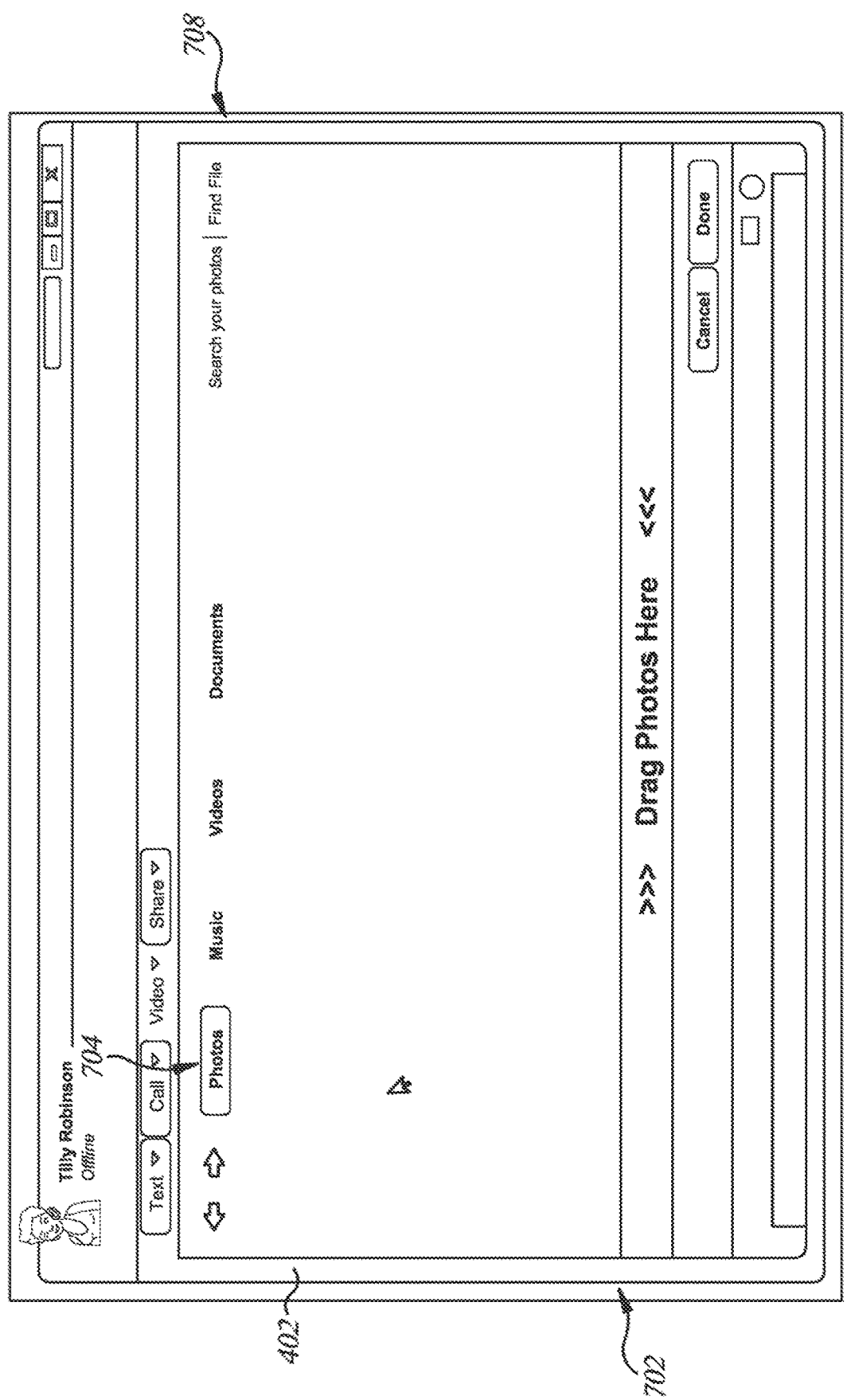

FIG. 7 illustrates a photo sharing window prior 702 to the loading of photos for sharing. As shown, the photo choice 704 is selected, and voice calling and text messaging is ongoing. The user is waiting for photos to be dragged or populated in the window so that one or more can be selected for sharing with the other user. Options 708 such as "search your photos" and "find file" are provided for a user to dialog box asking the user what to share. These options may enable searching based on a user provided criteria, searching over a network (e.g., using a search engine), or the like.

Figure 8:
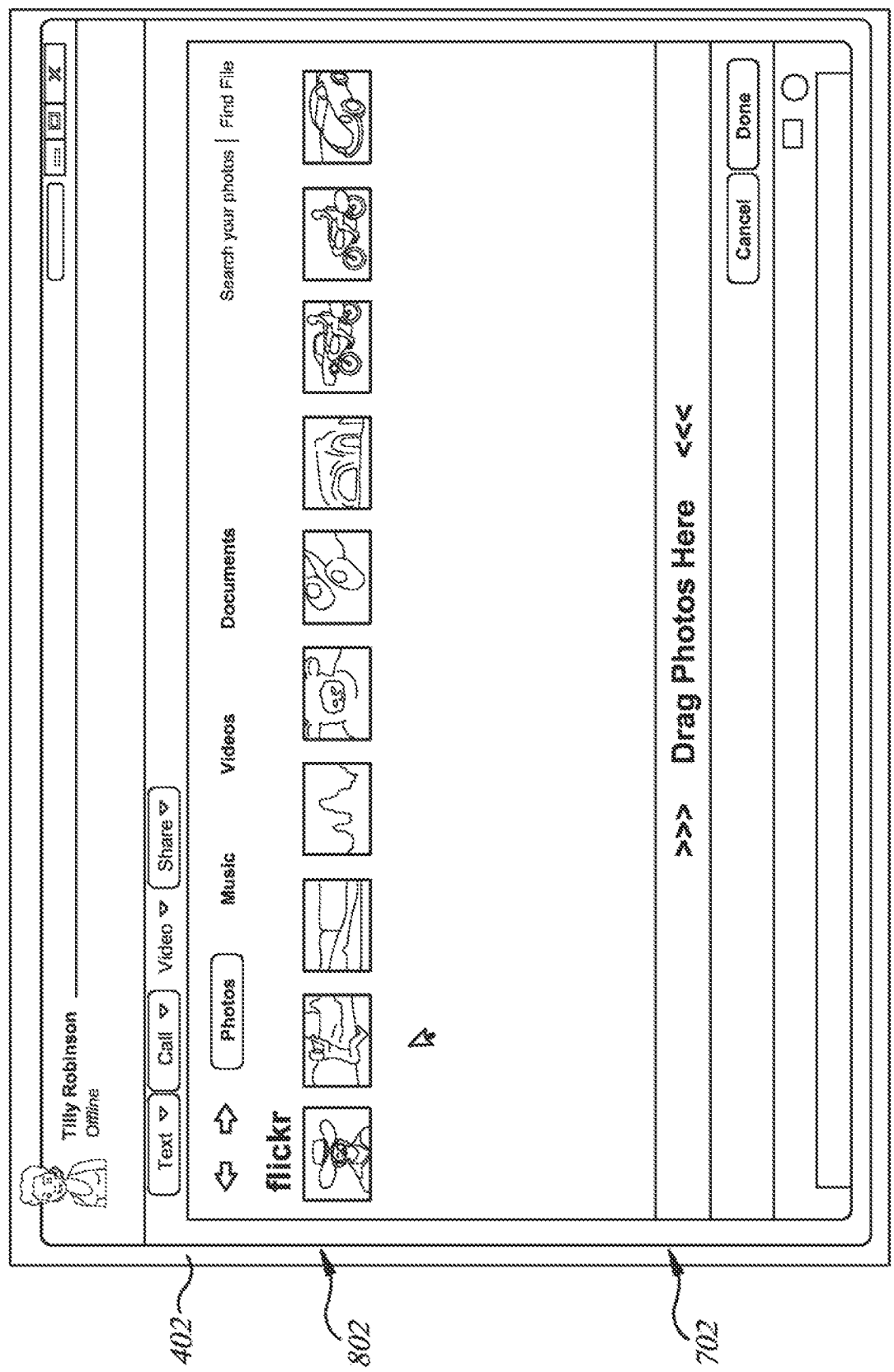

FIG. 8 illustrates the most recent photos 802 that are available for sharing in the window. It is understood that the photos may be provided from one or more sources, including other entities, properties, and third parties (e.g., the website Flickr), As shown, a selected photo may be dragged-and-dropped into sharing strip 702.

Figure 9:
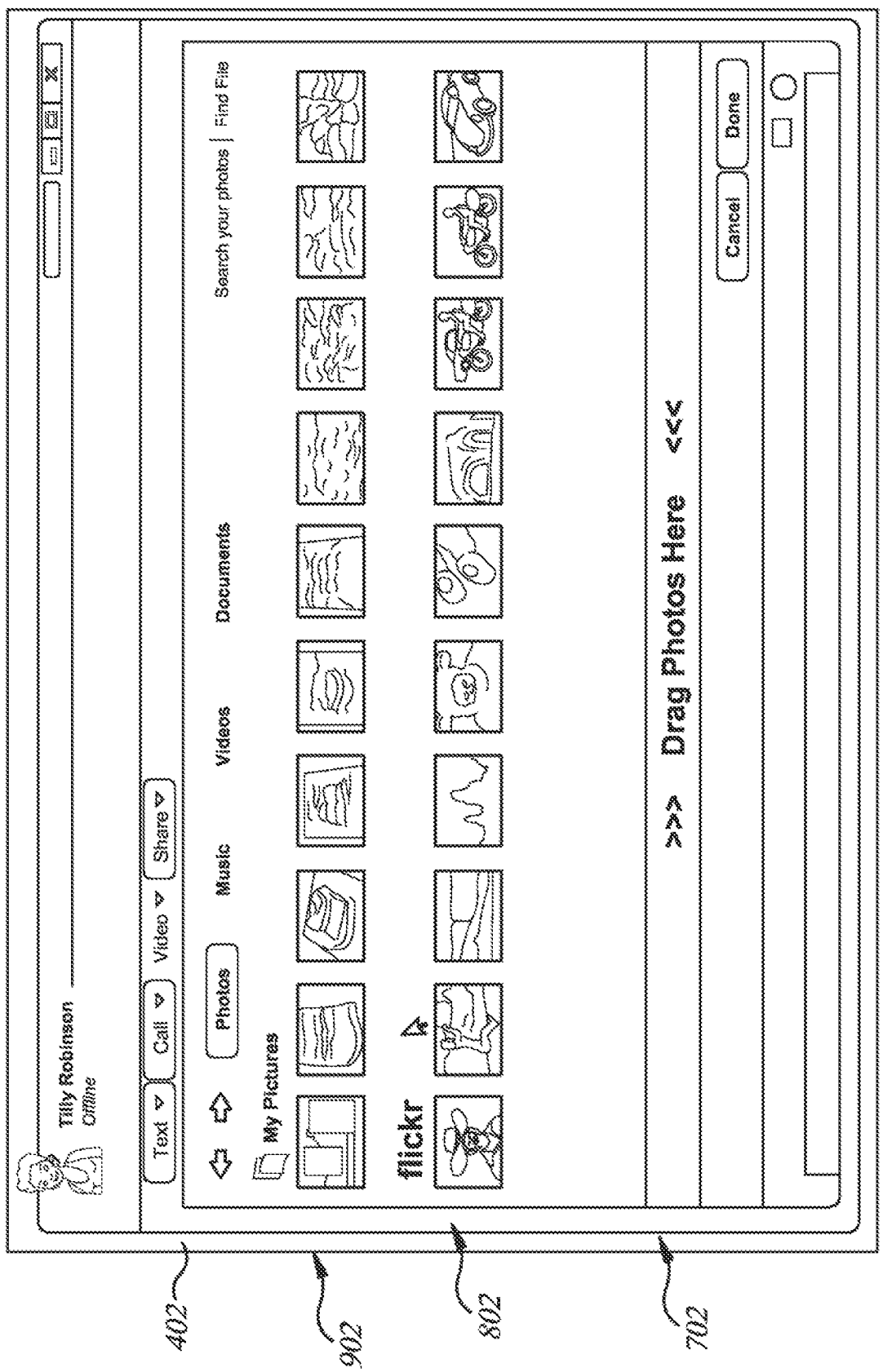

FIG. 9 illustrates the most recent photos 902 that are located on a local personal computer that are available for sharing in the window. Other photos 802 from a third-party source may also be displayed in addition to (e.g., side-by-side with) photos from the local personal computer. It is understood that the photos may be provided from one or more applications on the personal computer. Also, a search facility can be employed to filter results based on size, timestamp, and the like.

Figure 10:
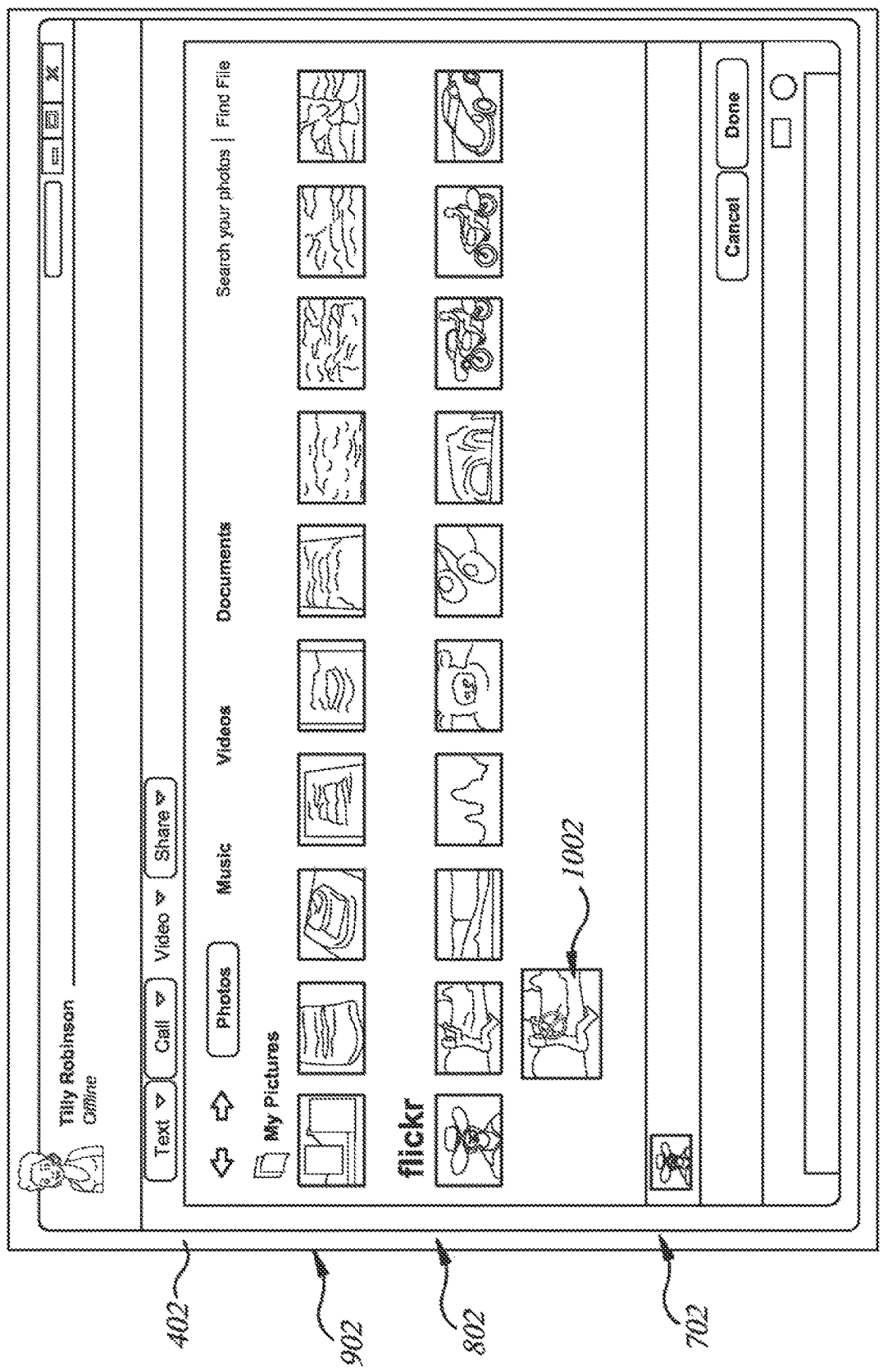
Figure 11:
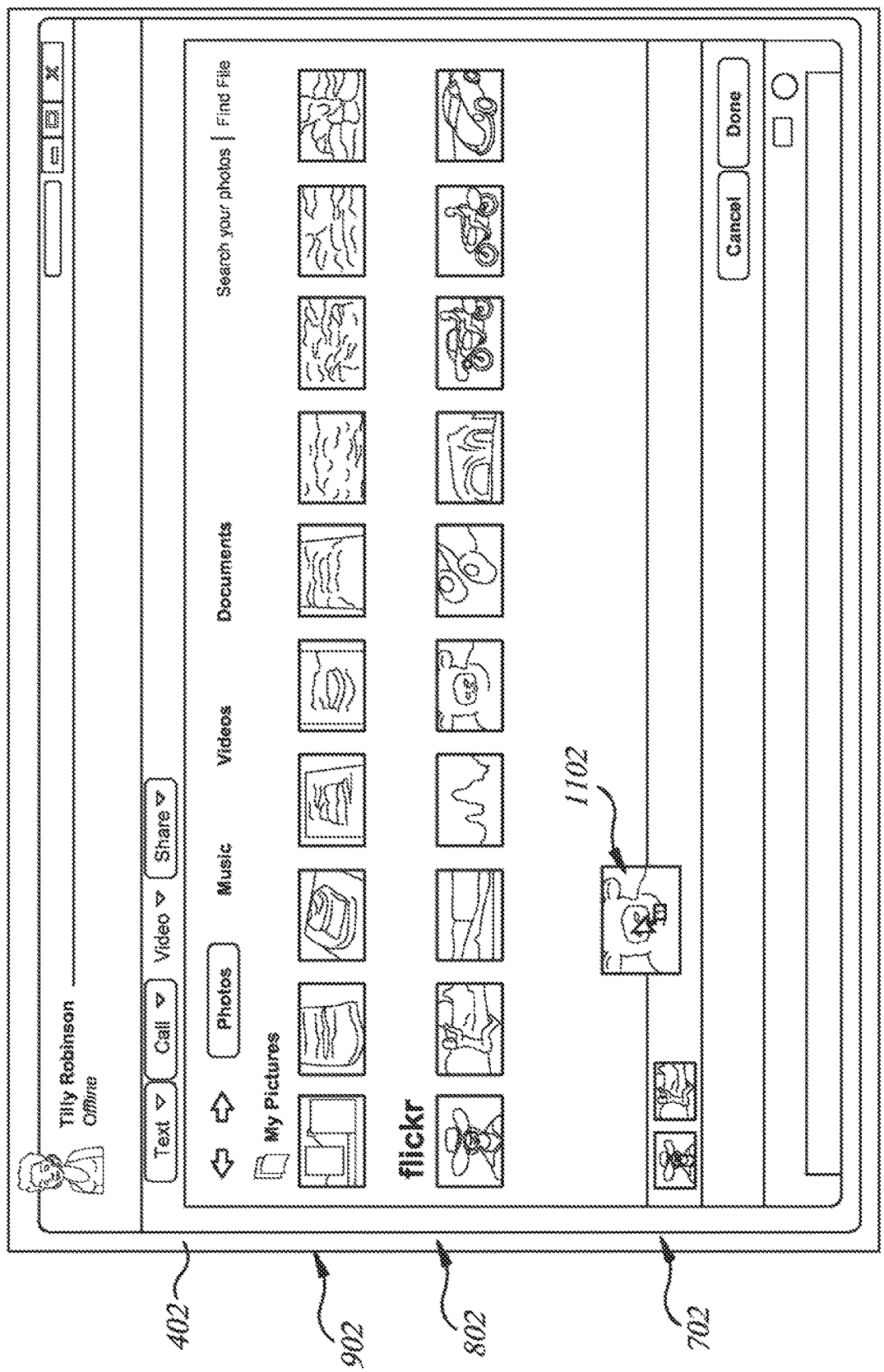

FIGS. 10 and 11 illustrate the user dragging and dropping photos into a sharing strip 702 in the lower section of the window. For example, thumbnail 1002 is dragged into the sharing strip 702. Thumbnail 1102 is also dragged into sharing strip 702 and ordered higher than thumbnail 1002.

Figure 12:
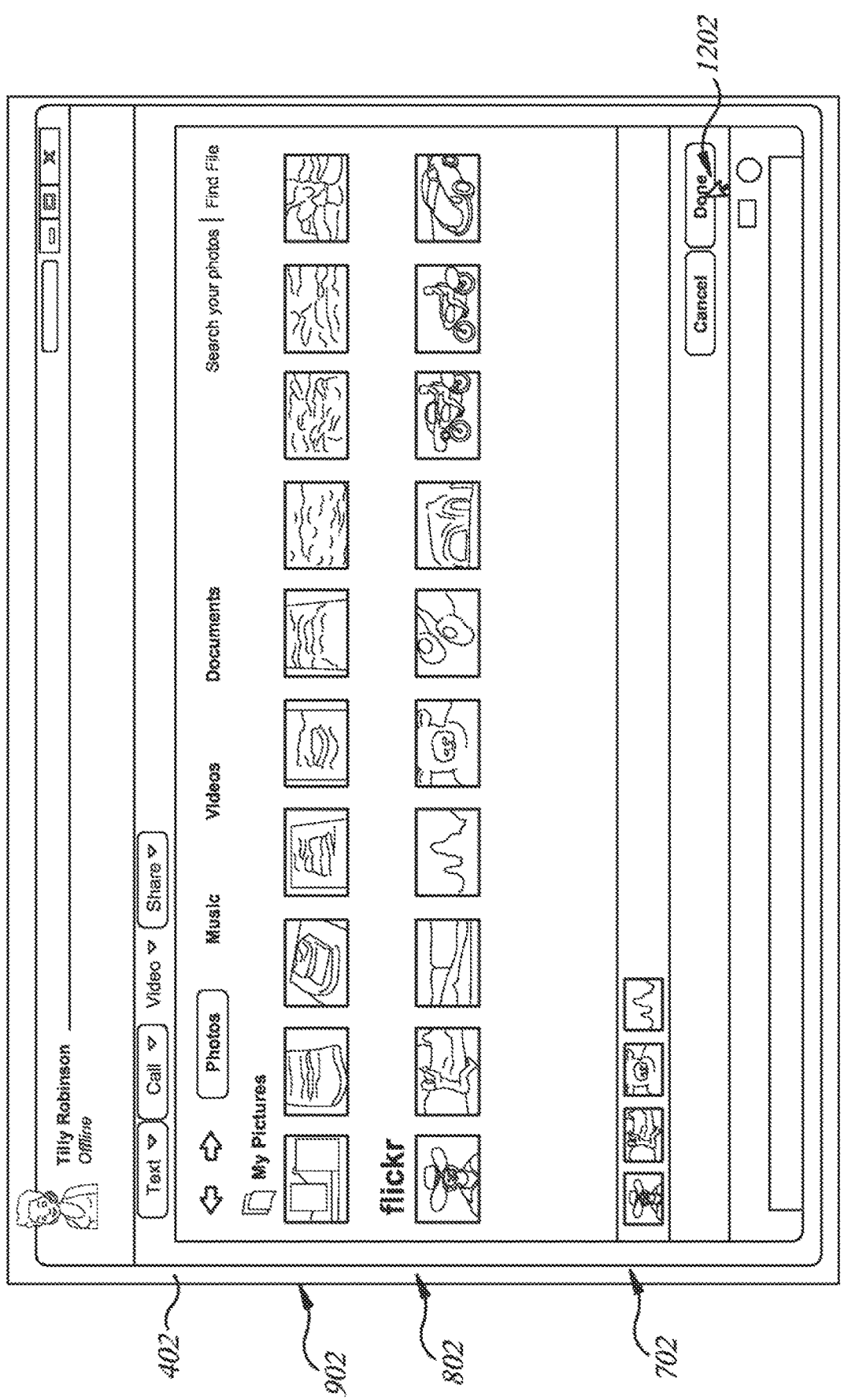

FIG. 12 illustrates the user done with choosing photos for the initial set of photos to share, i.e., dragging and dropping photos into a sharing strip in the lower section of the window. In one embodiment, the user may press done button 1202 to indicate that the photos associated with the thumbnail in the sharing strip 702 is to be shared. In another embodiment, sharing may occur as a thumbnail is dragged-and-dropped into the sharing strip 702.

Figure 13:
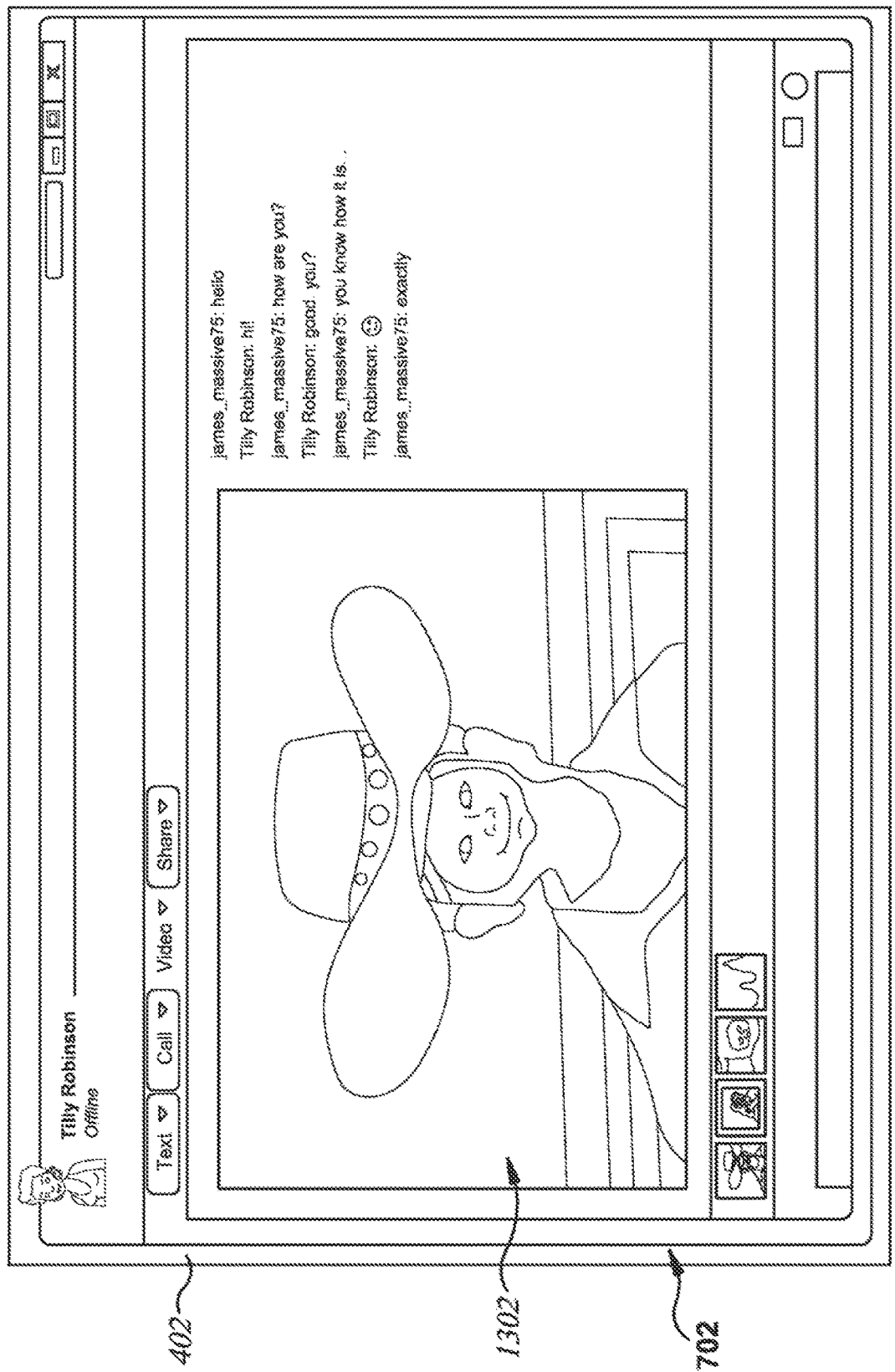

FIG. 13 illustrates the photo sharing window 702 being shared with the other users that are in simultaneous communication by both text and voice. Each user can see the previously selected photos in the sharing strip 702, and can add more photos to the share in the sharing strip 702. As shown, the selected thumbnail for the photo from sharing strip 702 is displayed in high(er) resolution image 1302. In one embodiment, high(er) resolution image 1302 may be displayed on each of the users' display at the same time. Although not shown, instead of or in addition to providing higher resolution image 1302, other multimedia information may be provided to each of the users (e.g., to network devices associated with the user). For example, music or video may be provided. In another embodiment, each of the users may select a different thumbnail to provide different multimedia information to each of the users. In other embodiments not shown, one or more videos can be also shared in the sharing strip 702 while video, voice, and/or text communication is simultaneously occurring between the users.

Figure 14:
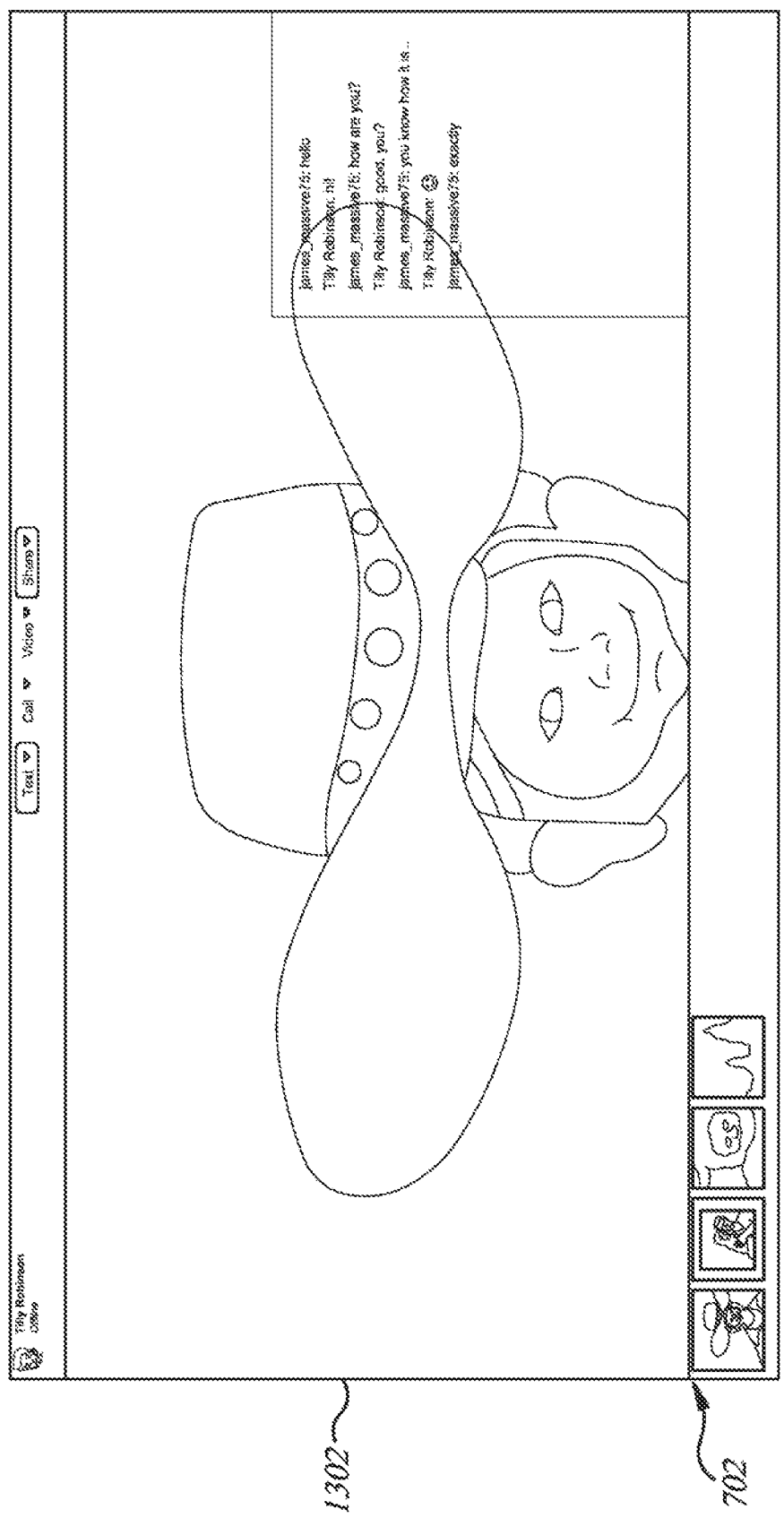

FIG. 14 illustrates full screen photo sharing window 702 being shared with the other users that are in simultaneous communication by both text and voice. Each user can still see the previously selected photos in the sharing strip 702, and can add more photos to the share in the sharing strip 702. In other embodiments not shown, one or more videos can be also shared in the sharing strip 702 while video, voice, and/or text communication is simultaneously occurring between the users.

Generalized Operation

Figure 15:
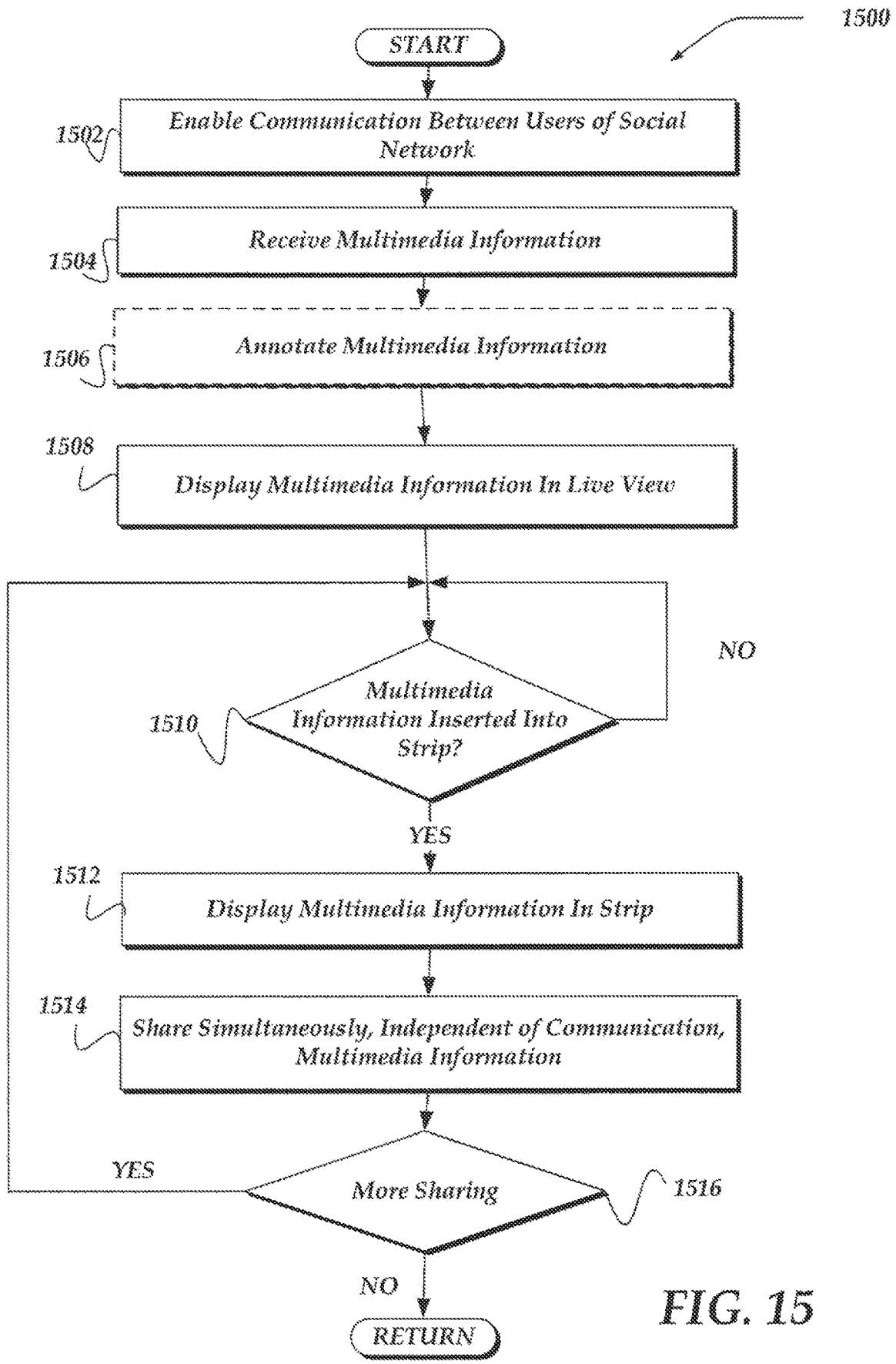
FIG. 15 illustrates one embodiment for a flow diagram of a process managing a multimedia communication, in accordance with the invention.

The operation of certain aspects of the invention will now be described with respect to FIG. 15. FIG. 15 illustrates a logical flow diagram generally showing one embodiment of a process for managing a multimedia communication. Process 1500 of FIG. 15 might be implemented, for example, within MSS 106 of FIG. 1.

Process 1500 begins, after a start block, at block 1502, where a communication between users is enabled. In one embodiment, the users belong to a same social network. In one embodiment, the communication may be enabled if a user and another user are a degree of separation from each other (e.g., at least two degrees of separation from each other in a same social network). The communication may include a voice communication, a text communication, a video communication, or the like. In one embodiment, the communication may be enabled over a plurality of channels. The channels may include at least one of Short Message Service (SMS), Multimedia Message Service (MMS), instant messaging (IM), internet relay chat (IRC), Voice Over Internet Protocol (VOIP), or the like. Processing next continues to block 1504.

At block 1504, multimedia information is received. In one embodiment, receiving the multimedia information may comprise retrieving, searching, filtering, or otherwise processing the multimedia information, based on, for example, attributes of a file associated with the multimedia information. The attributes may include the file name, size, date modified, a rating, or the like. In one embodiment, the multimedia information may be retrieved or otherwise received from at least one source. For example, the multimedia information may be received from a network device over a network, from a directory on the computing device, from a plurality of applications of different types, or the like. In one embodiment, the multimedia information may be retrieved from a user's desktop, using an operating system interface (e.g., using an SQL query, an search engine interface, information retrieval interface, a Windows Vista™ indexing service, a Windows XP™ indexing service, or the like). In one embodiment, the following search query may be sent to the operating system to search for files (e.g., for attributes and/or tags associated with the files) on a desktop, a file system, within a plurality of directories in a file system, at least one remote website, or the like:

```
SELECT TOP NUM_RESULT \"System.FileName\", \"System.Size\",
\"System.DateModified\", \"System.ItemUrl\", \"System.FileExtension\",
\"System.MIMEType\", \"System.ThumbnailCacheID\", \"System.Keywords\",
\"System.Image.HorizontalSize\", \"System.- Image.VerticalSize\" FROM
SYSTEMINDEX..SCOPE( ) WHERE \"System.MIMEType\" LIKE `image/%`
AND \"System.Size\" > 102400 AND \"System.FileName\" LIKE
`%SEARCH_STRING%` ORDER BY \"System.DateModified\" DESC"
```

As shown, the search may be based on a plurality of attributes of files associated with the multimedia information. In one embodiment, SEARCH_STRING may be a search term (or may be empty and optional). In one embodiment, the search terms may be a specified term. For example, the terms may be entered by the user in the live view, may be terms recently searched by the user, a member of the social network, a member of the social network a degree of separation from the user, an aggregate of popular terms searched for in the social network, or the like. NUM_RESULT may be the number of results predefined by a threshold, by the user, capable of being displayed in a window (e.g., a simultaneous sharing window). However, the invention is not constrained to this example, and other formats, commands, search terms, and the like may also be employed.

In another embodiment, the multimedia information may be retrieved from a third-party source (e.g., the website Flickr, a search engine, or the like). In one embodiment, a search term(s) may be sent to the third-party source, and a result list including at least one URL for a file associated with the multimedia information may be returned. In another embodiment, the third-party source may provide an API to retrieve the multimedia information. For example, a token for the user may be received from the third-party. Using the token, a search may be initiated on the third party for photos associated with a user (e.g., the user, the social network, users a degree of separation from the user, or the like). A result set may be provided by the third-party. In one embodiment, a list of photos, names and/or tags associated with the photos, a list of URLs to thumbnails of the photos, or the like may be provided. The result set may be filtered based on a search term, date, or the like. If the search term is empty then all multimedia information in the result set are selected for further processing. In one embodiment, the search term may be used to filter search result sets from at least two of the plurality of sources of multimedia information. Processing next continues to block 1506.

At block 1506, optionally, multimedia information may be annotated. Annotation may comprise associating other information such as an identifier, text, or the like, with the multimedia information. The other information may include a time/date, name, GPS position, tag, comment, rating or the like. The multimedia information may be annotated by the user and/or done automatically. For example, the user may annotate with a name for a selected photo/multimedia information. In another example, a device may automatically annotate with a time of day/week/month and/or GPS position. As shown, block 1506 may be optional and may not be performed. Processing next continues to block 1508.

At block 1508, the multimedia information is displayed in a live view. In one embodiment, prior to displaying in the live view, the multimedia information may be filtered based on at least one of a size, a timestamp of the multimedia information, or the like. The multimedia information may be ordered or grouped by the source of the multimedia information. The multimedia information may also be sorted by the timestamp. Processing next continues to decision block 1510.

At decision block 1510, it is determined if multimedia information has been inserted into a sharing strip. In one embodiment, placing may comprise appending or concatenating the multimedia information to the shared strip, inserting the multimedia information in between other multimedia information in the shared strip, or the like. In one embodiment, inserting may comprise detecting a drag-and-drop of the multimedia information into the sharing strip. If the multimedia information has been inserted into the sharing strip, processing continues to block 1512. Otherwise, processing loops back to decision block 1510 to wait for the multimedia information to be inserted.

At block 1512, the multimedia information is displayed in the sharing strip. In one embodiment, a thumbnail associated with the multimedia information is displayed. The sharing strip may include a plurality of thumbnails, with each thumbnail associated with a different multimedia information. The sharing strip may enable ordering/re-ordering of the plurality of thumbnails. In one embodiment, the multimedia information/thumbnail may be ordered based on, for example, the time at which the multimedia information was selected to be inserted into the sharing strip. Processing next continues to block 1514.

At block 1514, the multimedia information is shared simultaneously and independent of the enabled communication. In one embodiment, sharing may include sending the multimedia information between the users, sending an annotation (e.g., annotated at block 1506) associated with the multimedia information between the users, displaying the shared multimedia information in a live view, or the like. In one embodiment, simultaneously sharing may comprise sending the multimedia information associated with the selected thumbnail, if the selected thumbnail is detected as drag-and-dropped into a sharing strip. In another embodiment, simultaneously sharing may comprise sending the multimedia information associated with a selected thumbnail (e.g., in a sharing strip) while sending at least one of a Short Message Service (SMS), Multimedia Message Service (MMS), instant messaging (IM), internet relay chat (IRC), Voice Over Internet Protocol (VOIP) message, or the like. In another embodiment, a plurality of multimedia information may be sent in a send order based on an order of different selected thumbnails in the sharing strip, wherein each of the plurality of the multimedia information is associated with a different selected thumbnail in the sharing strip.

In one embodiment, at least two of the users participating in the enabled communication may each have a sharing strip displayed on different network devices. The same thumbnail associated with the multimedia information may be displayed in both sharing strips. Each of the users may add, move, or remove the thumbnails, order/re-order the thumbnails, and/or annotate the multimedia information associated with the thumbnails in their respective sharing strip. A change to one sharing strip may be sent between the different network devices.

In one embodiment, at least one of the users participating in the communication may select a selected multimedia information to be displayed or otherwise provided. For example, a user may select a thumbnail in the strip, and consequently, a video associated with the selected thumbnail may begin playing on the user's display and/or on another user's display, wherein the user and the other user is also participating in the communication. Shared play-back may also enable at least one of the users to otherwise manipulate the provided multimedia information. For example, either user may stop the video, rewind the video, speed-up the video, or the like for the user's display and/or the other user's display.

In another embodiment, an automatic playback may be enabled based on the multimedia information associated with the sharing strip. For example, a slide-show may be provided based on the thumbnails in the sharing strip in the order of the thumbnails in the sharing strip. Processing next continues to decision block 1516.

At decision block 1516, it is determined whether more multimedia information is to be shared. If more multimedia information is to be shared, then processing loops back to decision block 1510. Thereby, more multimedia information may be simultaneously shared, annotated, and displayed by a plurality of users, independent of the communication. For example, a process 1500 may be performed multiple times for more than one of the users. Otherwise, processing returns to a calling process for further processing.

It will be understood that the illustrative uses in the figures, can be implemented by computer program instructions. These program instructions may be provided to a processor to produce a machine, such that the instructions, which execute on the processor, create means for implementing the actions specified. The computer program instructions may be executed by a processor to cause a series of operational steps to be performed by the processor to produce a computer implemented process such that the instructions, which execute on the processor to provide steps for implementing the actions specified. The computer program instructions may also cause at least some of the operational steps to be performed in parallel. Moreover, some of the steps may also be performed across more than one processor, such as might arise in a multi-processor computer system. In addition, one or more combinations of uses in the drawings may also be performed concurrently with other uses, or even in a different sequence than illustrated without departing from the scope or spirit of the invention.

Accordingly, the illustrative uses and diagrams support combinations of means for performing the specified actions, combinations of steps for performing the specified actions and program instruction means for performing the specified actions. It will also be understood that each of the illustrated uses, and combinations of uses in the drawings, can be implemented by special purpose hardware-based systems which perform the specified actions or steps, or combinations of special purpose hardware and computer instructions.

What is claimed is:

1. A method comprising:
generating, by a network platform, a slide show comprising media items appended in an order based on timestamps, the media items comprising user-submitted media items selected for sharing by a plurality of user devices;
causing, on a first user device of the plurality of user devices, presentation of the slide show;
causing, on a second user device of the plurality of user devices, presentation of the slide show;
receiving, from the second user device, an additional media item as a submission to the slide show, the additional media item being generated and annotated with an annotation by the second user device;
updating, by the network platform, the slide show to display the additional media item appended after the media items based on the order of timestamps, the user-submitted media items and the additional media item being automatically annotated in the slide show with a user interface tag; and
transmitting, by the network platform, the updated slide show, including the user-submitted media items and the additional media item to one or more of the plurality of user devices.

2. The method of claim 1, further comprising:
transmitting, by the network platform, the updated slide show to the second user device.

3. The method of claim 1, further comprising:
receiving, from the second user device, an electronic message for display with the additional media item of the slide show; and
causing, on a display device of the first user device, display of the electronic message with the additional media item.

4. The method of claim 1, wherein the media items are annotated with media information, wherein the slide slow displays the media items annotated with media information.

5. The method of claim 4, wherein the updated slide slow displays the media items annotated with the media information and the additional media item annotated with the annotation.

6. The method of claim 1, wherein the additional media item is submitted to the slide show by the second user device using a user interface element displayed on the second user device.

7. The method of claim 6, wherein the network platform annotates the additional media item by overlaying a content of the user interface tag on the additional media item.

8. The method of claim 6, wherein the user interface tag comprises one or more characters of text, a timestamp, or a comment.

9. The method of claim 1, wherein the slide show comprises a real-time slide show.

10. The method of claim 1, wherein the network platform is a social network site.

11. A system comprising:
a memory comprising instructions; and
one or more computer processors of a network platform, wherein the instructions, when executed by the one or more computer processors, cause the one or more computer processors to perform operations comprising:
generating, by the network platform, a slide show comprising media items appended in an order based on timestamps, the media items comprising user-submitted media items selected for sharing by a plurality of user devices;
causing, on a first user device of the plurality of user devices, presentation of the slide show;
causing, on a second user device of the plurality of user devices, presentation of the slide show;
receiving, from the second user device, an additional media item as a submission to the slide show, the additional media item being generated and annotated with an annotation by the second user device;
updating, by the network platform, the slide show to display the additional media item appended after the media items based on the order of timestamps, the user-submitted media items and the additional media item being automatically annotated in the slide show with a user interface tag; and
transmitting, by the network platform, the updated slide show, including the user-submitted media items and the additional media item to one or more of the plurality of user devices.

12. The system of claim 11, further comprising:
transmitting, by the network platform, the updated slide show to the second user device.

13. The system of claim 11, further comprising:
receiving, from the second user device, an electronic message for display with the additional media item of the slide show; and
causing, on a display device of the first user device, display of the electronic message with the additional media item.

14. The system of claim 11, wherein the media items are annotated with media information, wherein the slide slow displays the media items annotated with media information.

15. The system of claim 14, wherein the updated slide slow displays the media items annotated with the media information and the additional media item annotated with the annotation.

16. The system of claim 11, wherein the additional media item is submitted to the slide show by the second user device using a user interface element displayed on the second user device.

17. The system of claim 16, wherein the network platform annotates the additional media item by overlaying a content of the user interface tag on the additional media item.

18. The system of claim 16, wherein the user interface tag comprises one or more characters of text, a timestamp, or a comment.

19. The system of claim 11, wherein the slide show comprises a real-time slide show, wherein the network platform is a social network site.

20. A non-transitory machine-readable storage device including instructions that, when executed by one or more processors of a machine, cause the one or more processors to perform operations comprising:
generating, by a network platform, a slide show comprising media items appended in an order based on timestamps, the media items comprising user-submitted media items selected for sharing by a plurality of user devices;
causing, on a first user device of the plurality of user devices, presentation of the slide show;

causing, on a second user device of the plurality of user devices, presentation of the slide show;

receiving, from the second user device, an additional media item as a submission to the slide show, the additional media item being generated and annotated with an annotation by the second user device;

updating, by the network platform, the slide show to display the additional media item appended after the media items based on the order of timestamps, the user-submitted media items and the additional media item being automatically annotated in the slide show with a user interface tag; and transmitting, by the network platform, the updated slide show, including the user-submitted media items and the additional media item to one or more of the plurality of user devices.

\* \* \* \* \*